US010273370B2

(12) United States Patent
Lang

(10) Patent No.: US 10,273,370 B2
(45) Date of Patent: Apr. 30, 2019

(54) COMPOSITION FORMING AN INSULATING LAYER AND USE OF SAID COMPOSITION

(71) Applicant: Hilti Aktiengesellschaft, Schaan (LI)

(72) Inventor: Martin Lang, Planegg (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 14/780,356

(22) PCT Filed: Mar. 26, 2014

(86) PCT No.: PCT/EP2014/056019
§ 371 (c)(1),
(2) Date: Sep. 25, 2015

(87) PCT Pub. No.: WO2014/154729
PCT Pub. Date: Oct. 2, 2014

(65) Prior Publication Data
US 2016/0068689 A1    Mar. 10, 2016

(30) Foreign Application Priority Data

Mar. 26, 2013    (DE) .................. 10 2013 205 348

(51) Int. Cl.
C09D 5/18        (2006.01)
C08K 3/22        (2006.01)
C08K 3/26        (2006.01)
C08F 16/00       (2006.01)

(52) U.S. Cl.
CPC ............... *C09D 5/185* (2013.01); *C08K 3/22* (2013.01); *C08K 3/26* (2013.01); *C08F 16/00* (2013.01); *C08K 2003/2241* (2013.01); *C08K 2003/262* (2013.01)

(58) Field of Classification Search
None
See application file for complete search history.

(56) References Cited

U.S. PATENT DOCUMENTS

| | | | |
|---|---|---|---|
| 3,562,197 A | 2/1971 | Sears et al. | |
| 3,969,291 A | 7/1976 | Fukuba et al. | |
| 4,442,157 A | 4/1984 | Marx et al. | |
| 6,251,961 B1* | 6/2001 | Pirig ................. | C09D 5/185 521/179 |
| 2004/0132910 A1 | 7/2004 | Magnet et al. | |
| 2004/0256605 A1* | 12/2004 | Reinheimer ............ | C08K 9/02 252/606 |
| 2008/0281006 A1 | 11/2008 | O'Leary et al. | |
| 2012/0164462 A1 | 6/2012 | Schmitt et al. | |
| 2014/0343182 A1* | 11/2014 | Jin ........................ | C08J 9/14 521/149 |
| 2015/0337160 A1 | 11/2015 | Brinkhorst et al. | |

FOREIGN PATENT DOCUMENTS

| | | |
|---|---|---|
| DE | 199 09 387 A1 | 9/2000 |
| DE | 10 2007 034 458 A1 | 1/2009 |
| EP | 0 138 546 A2 | 4/1985 |
| EP | 0 139 401 A1 | 5/1985 |
| EP | 0 477 840 A1 | 4/1992 |
| EP | 1 462 501 A1 | 9/2004 |
| EP | 1 489 136 A1 | 12/2004 |
| GB | 755551 | 8/1956 |
| GB | 2 007 689 A | 5/1979 |
| RU | 2 302 440 C2 | 7/2007 |
| WO | WO 2005/037933 A2 | 4/2005 |
| WO | WO 2010/030771 A1 | 3/2010 |
| WO | WO 2011/124663 A1 | 10/2011 |
| WO | WO 2013/101682 A1 | 7/2013 |
| WO | WO 2014/095516 A1 | 6/2014 |

OTHER PUBLICATIONS

International Search Report (PCT/ISA/210) issued in PCT Application No. PCT/EP2014/056019 dated Jun. 10, 2014 with English translation (Six (6) pages).
International Preliminary Report on Patentability (PCT/IB/373) issued in PCT Application No. PCT/EP2014/056019 dated Sep. 29, 2015 including German-language Written Opinion (PCT/ISA/237) issued in PCT Application No. PCT/EP2014/056019 dated Jun. 10, 2014 with English translation English translation (Twelve (12) pages).
"Flammschutz-Online: Intumeszenz-Flammschutzsysteme," XP002724981, with English translation, URL: http://www.flameretardants-online.com/web/de/106/110.htm, Sep. 16, 2015 (Four (4) pages).
Diez-Barra, E., et al., "A Study on the Phase Transfer Catalysed Michael Addition," Tetrahedron 54,1998, Elsevier Science Ltd., pp. 1835-1844 (Ten (10) pages).
Chan, J. W., et al., "Nucleophile-Initiated Thiol-Michael Reactions: Effect of Organocatalyst, Thiol, and Ene," Macromolecules, 2010, vol. 43, No. 15, American Chemical Society, pp. 6381-6388 (Eight (8) pages).
Fabris, M., et al., "Ionic Liquids Made with Dimethyl Carbonate: Solvents as well as Boosted Basic Catalysts for the Michael Reaction," Chem. Eur. J. 2009, 15, Wiley-VCH Verlag GmbH & Co. KGaA, Weinheim, pp. 12273-12282 (Ten (10) pages).
Fabris, M., et al., "Methylcarbonate and Bicarbonate Phosphonium Salts as Catalysts for the Nitroaldol (Henry) Reaction," The Journal of Organic Chemistry, 2012, 77, American Chemical Society, pp. 1805-1811 (Seven (7) pages).

(Continued)

*Primary Examiner* — Robert T Butcher
(74) *Attorney, Agent, or Firm* — Crowell & Moring LLP

(57) ABSTRACT

The invention relates to a composition forming an insulating layer, which composition contains a binder, which is based on a compound having electron-deficient carbon multiple bonds and a carbanion-forming compound. By means of the composition according to the invention, the expansion rate of which is relatively high, coatings having the layer thickness required for the particular fire resistance time can be applied easily and quickly, wherein the layer thickness can be reduced to a minimum and nevertheless a great insulating effect can be achieved. The composition according to the invention is suitable especially for fire protection, in particular as a coating of steel components, such as supports, beams and truss members, for increasing the fire resistance time.

15 Claims, No Drawings

(56) References Cited

OTHER PUBLICATIONS

Levchik, S., et al., "Thermal Decomposition, Combustion and Flame-Retardancy of Epoxy Resins—a Review of the Recent Literature," Polymer International, 2004, 53, Society of Chemical Industry, pp. 1901-1929 (Twenty-Nine (29) pages).
Weil, E. D., et al., "Flame Retardants for Plastics and Textiles—Practical Applications," Sample Chapter 3: Polystyrenes and Thermoplastic Styrene Copolymers, 2009, Hanser, pp. 34-57 (Twenty-Four (24) pages).
Auszug aus Römpp-Lexikon, "Flammschutzmittel," Apr. 2009, (22 pages) with English translation.

* cited by examiner

COMPOSITION FORMING AN INSULATING LAYER AND USE OF SAID COMPOSITION

This invention relates to a composition forming an insulating layer, in particular a composition with intumescent properties that forms a binder on the basis of a compound having electron-deficient carbon multiple bonds and a carbanion-forming compound, as well as its use for fire protection, in particular for coatings of components such as supports, beams or truss members to increase the fire resistance time.

Compositions that form an insulating layer, also called intumescent compositions, are conventionally applied for the formation of coatings on the surface of components to protect them against fire or the effects of high heat, e.g., as the result of the fire. Steel structures have recently become a fixed component of modern architecture, although they have one important disadvantage in comparison with reinforced concrete. Above approximately 500° C., the load-bearing capacity of the steel decreases by 50%, i.e., the steel loses a large portion of its stability and its load-bearing capacity. Depending on the fire load, such as during direct exposure to flames (approximately 1000° C.), this temperature can be reached after approximately 5-10 minutes, which frequently results in a loss of load-bearing ability of the structure. The objective of fire protection, in particular of the fire protection of steel, is to extend the length of time until a steel structure loses its load-bearing capacity in the event of fire as long as possible so that human life and valuable property can be rescued.

In the construction codes of many countries, corresponding fire resistance times or fire ratings for certain steel structures are required. They are defined by what are called F Classes, such as F 30, F 60, F 90 (fire rating classes according to DIN 4102-2) or US classes according to ASTM, etc. According to DIN 4102-2, for example, F 30 means that in the event of a fire, under standard conditions, a load-bearing steel structure must withstand the fire for at least 30 minutes. This is conventionally achieved by delaying the rate at which the steel is heated, e.g., by coating the steel structure with coatings that form an insulating layer. In the event of a fire, the components of these coatings expand to form a solid microporous carbon foam. A fine-pored and thick layer of foam, which is also called an ash crust, is thereby formed which, depending on its composition, acts as an effective thermal insulator and thus delays the heating of the component so that the critical temperature of approximately 500° C., is not exceeded until at least 30, 60, 90, 120 minutes or up to 240 minutes have elapsed. The thickness of the applied coating layer is always essential for the fire rating that can be achieved or the ash crust that develops from it. Closed structural shapes such as tubes with a similar compactness require approximately twice the quantity in comparison to open structural shapes, such as beams with a double-T profile. To obtain the required fire ratings, the coatings must have a specified thickness and have the ability under the action of heat to form an ash crust which is as voluminous as possible and therefore a good insulator and remains mechanically stable over the period of exposure to the fire.

The prior art describes various systems for this purpose. Essentially, a distinction is made between 100% systems and solvent-based or water-based systems. In the solvent-based or water-based systems, binders, generally resins, are applied to the component in the form of a solution, dispersion or emulsion. These can be implemented in the form of single-component or multi-component systems. After application, the solvent or the water evaporates and leaves behind the film that dries with time. In this regard, a further distinction can be made between systems in which the coating essentially no longer changes during the drying and systems in which, after evaporation, the binder hardens primarily by oxidation and polymerization reactions, a process that can be induced by the oxygen in the air, for example. The 100% systems contain the components of the binder without solvents or water. They are applied to the component and the "drying" of the coating is achieved by a reaction of the components of the binder among themselves and/or by a reaction with components of the atmospheric air such as water, for example.

The solvent-based or water-based systems have the disadvantage that the drying times, also called curing times, are long, and a plurality of layers must also be applied, i.e., a plurality of work procedures are required, to achieve the necessary layer thickness. Because each individual layer must be appropriately dried before the application of the next layer, this leads to a high requirement in terms of working time and correspondingly high costs, as well as a delay in the completion of the structure because, depending on climatic conditions, several days may sometimes pass until the required layer thickness has been applied. An additional disadvantage is that as a result of the required layer thickness, the coating can have a tendency to crack or flake during drying or under the effects of heat, as result of which, in the worst case, the substrate can be partly exposed, in particular in systems in which the binder does not continue to cure after the evaporation of the solvent or the water.

To get around this disadvantage, two-component or multi-component epoxy-amine-based systems have been developed that work almost entirely without solvents, so that the curing takes place significantly more rapidly and thicker coatings can also be applied in a single work process so that the required coating thickness is built up significantly more rapidly. These systems have the disadvantage, however, that the binder forms a very stable and rigid polymer matrix, frequently with a high softening range, which prevents the formation of foam by the foaming agents. Therefore thick layers must be applied to produce a sufficient foam thickness for the insulation. This is in turn a disadvantage because a great deal of material is required. Processing temperatures of up to +70° C. are frequently necessary for the application of these systems, which makes the use of these systems labor-intensive and expensive to install. Furthermore, some of the binder components used are toxic or otherwise hazardous (e.g., burning, caustic), such as the amines or amine mixtures used in the epoxy-amine systems.

In the sector of decorative and protective coatings, the Michael addition is a known curing mechanism. The reaction is conventionally catalyzed with strong bases such as an amidine base, for example. In formulations based on polymers that have hydrolytically cleavable bonds such as polyester, that however has the disadvantage that the coatings have a reduced stability against hydrolysis. WO 2010/030771 A1, for example, describes a method for the application of a curable composition to a substrate, wherein the curing takes place by the Michael addition of a compound that contains active hydrogen atoms to polyenes in the presence of a phosphine catalyst. The Michael addition as a curing mechanism is also known in the adhesives sector, for example as described in EP 1462501 A1.

However, a fire protection coating on this basis that contains the fire protection additives is not known. Nor does the prior art contain any information on the proportion up to which the fire protection additives can be contained.

The object of the invention is therefore to create a coating system of the type described above that forms an insulating layer, eliminates the above-mentioned disadvantages, is in particular not solvent-based or water-based, cures quickly, is easy to apply on account of a balanced viscosity and requires only a low layer thickness on account of the high expansion that can be achieved, i.e., the formation of an effective ash crust layer.

This object is accomplished by the composition described in claim 1. Preferred embodiments of the invention are described in the sub-claims.

The object of the invention is accordingly a composition that forms an insulating layer with an ingredient A that contains a polyfunctional Michael acceptor, that has at least 2 electron-deficient carbon multiple bonds per molecule as functional Michael acceptor groups, with an ingredient B that contains a polyfunctional Michael donor, that has at least two acid C, H bonds per molecule as functional Michael donor groups, with an ingredient C that contains an additive that forms an insulating layer, and with a catalyst for the Michael addition reaction.

As a result of the composition claimed by the invention, coatings with the layer thickness required for the respective fire rating can be applied easily and quickly. The advantages achieved by the invention are essentially to be seen in the fact that the processing time can be significantly reduced in comparison with solvent-based or water-based systems with their inherently slow curing times. On account of the low viscosity of the composition in the application range, which is set by means of suitable thickener systems, in contrast to epoxy-amine systems, the composition can be applied without heating, for example by means of the widely used airless spray method.

An additional advantage of the invention lies in the fact that substances that are hazardous to health and require special labeling, such as critical amine compounds, for example, can be largely or completely eliminated.

On account of the softening range of the polymer matrix, which is lower than that of epoxy-amine-based systems, the intumescence with regard to the expansion rate is relatively high so that even with thin layers a high insulating effect is achieved. A determining factor is also the potentially high filler content of the composition with fire protection additives, which can be achieved even without the use of highly volatile solvents. Correspondingly, the cost of material decreases, which has a favorable effect on the material costs, especially for applications that are required to cover large surface areas. This is achieved in particular by the use of a reaction system that does not drive physically, but is chemically cured by means of an addition reaction. Therefore the compositions suffer no loss of volume as a result of the drying of solvents or of water in water-based systems. In a conventional system, for example, a solids content of approximately 25% is typical. That means that of a wet film coating 10 mm thick, only 7.5 mm remains as the actual protection layer on the substrate to be protected. In the compound claimed by the invention, more than 95% of the coating remains on the substrate to be protected. In the event of a fire, the composition claimed by the invention forms a very hard and stable ash crust even without the addition of a high proportion of ash crust stabilizers. The compositions claimed by the invention have excellent adherence to steel, cohesion and impact resistance compared to solvent-based or water-based systems if they are applied without a primer.

The explanations of the terminology used in this application are presented below for a clearer understanding of the invention, as used in the context of the invention:

a "Michael addition" is generally a reaction between a Michael donor and a Michael acceptor, frequently in the presence of a catalyst such as a strong base, for example; the Michael addition is sufficiently known and frequently described in the literature;

a "Michael acceptor" is a compound with at least one C—C double bond or C—C triple bond that is not aromatic and that is electron-deficient; the Michael acceptor is composed of the functional Michael acceptor group and a backbone;

a "functional Michael acceptor group" is the group in the Michael acceptor that comprises a functional group, more accurately an electron-attracting group, and in the a position a C—C double bond or C—C triple bond to which the Michael donor is added; the electron-deficient C—C double bond or C—C triple bond is also called a Michael-active carbon multiple bond; the functional Michael acceptor group is bonded to the backbone or is incorporated into it; a Michael acceptor can have one or more separate functional Michael acceptor groups; each functional Michael acceptor group can have a Michael-active carbon multiple bond; the total number of Michael-active carbon multiple bonds to the molecule corresponds to the functionality of the Michael acceptor;

a "polyfunctional Michael acceptor" is a compound that has two or more functional Michael acceptor groups or Michael-active carbon multiple bonds;

"electron-deficient" means that the carbon multiple bond carries electron-attracting groups in the immediate vicinity, i.e., generally on the carbon atom next to the multiple bond, which electron groups reduce the electron density of the multiple bond, such as C=O, for example;

a "Michael donor" is a C,H-acid compound, i.e., a compound with at least one acid C, H bond that can form at least one carbanion that is capable of being added to the Michael acceptor; the acid hydrogen atom is also called a Michael-active hydrogen atom; the Michael donor consists of the functional Michael donor group and a backbone;

a "functional Michael donor group" is the group in the Michael donor that comprises a functional group, and in the a position for this purpose the carbon atom from which the carbanion is formed; the functional Michael donor group is bonded to the backbone; a Michael donor can have one or more separate functional Michael donor groups; each functional Michael donor group can have a Michael-active hydrogen atom; the total number of Michael-active hydrogen atoms in the molecule corresponds to the functionality of the Michael donor;

a "polyfunctional Michael donor" is a compound that has two or more functional Michael donor groups or Michael-active hydrogen atoms;

the "backbone" is the part of the donor or acceptor molecule to which the functional Michael donor group or the functional Michael acceptor group is attached;

"chemical intumescence" means the formation of a voluminous insulating ash layer by compounds matched to one another that react with one another under the action of heat;

"physical intumescence" means the formation of a voluminous insulating layer by the expansion of a compound which, although no chemical reaction between the two compounds takes place, releases gases under the action of heat, as a result of which the volume of the compound increases by a multiple of the original volume;

"forming an insulating layer" means that in the event of a fire, a solid microporous carbon foam is formed, so that the fine-pore and thick foam layer, also called the ash crust, depending on the composition, insulates a substrate against heat;

a "carbon supplier" is an organic compound that as a result of incomplete combustion leaves behind a carbon backbone and combusts incompletely to form carbon dioxide and water (carbonification); these compounds are also called "carbon backbone formers", an "acidifier" is a compound that under the action of heat, i.e., above approximately 150° C., for example, forms a non-volatile acid by decomposition and thereby acts as a catalyst for the carbonification; it can also contribute to lowering the viscosity of the melted binder; the term "dehydrogenation catalyst" is used to mean the same thing;

a "propellant" is a compound that decomposes at an elevated temperature, forming inert, i.e., non-combustible gases, and the carbon backbone formed by the carbonification and optionally the softened binder, expands into a foam (intumescence); this term is synonymous with "gas forming agent";

an "ash crust stabilizer" is a compound that forms a backbone and stabilizes the carbon backbone (ash crust) that is formed from the interaction of the carbon formation from the carbon source and the gas from the propellant or the physical intumescence. The theoretical mode of action is that the inherently very soft carbon layers that are formed are mechanically solidified by inorganic compounds; the addition of such an ash crust stabilizer contributes to a significant stabilization of the intumescence crust in the event of fire, because these additives increase the mechanical strength of the intumescent layer and/or prevent it from dripping;

"(meth)acryl . . . / . . . (methacryl . . . " means that both the "methacryl . . . / . . . methacryl . . . " and "acyl . . . /acryl . . . " compounds are intended;

An "oligomer" is a molecule with 2 to 5 repeating units and a "polymer" is a molecule with 6 or more repeating units and can have structures that are linear, branched, star-shaped, wound, hyper-branched or cross-linked; in general, polymers can have a unique type of repeating units ("homopolymers") or they can have more than one type of repeating units ("copolymers"). As used here, the term "resin" is a synonym for polymer.

In general, it is assumed that the reaction of a Michael donor with a functionality of two with a Michael acceptor with a functionality of two will lead to linear molecular structures. Frequently, molecular structures must be generated that are branched and/or cross-linked, for which purpose the use of at least one ingredient with the functionality of greater than two is necessary. Therefore the polyfunctional Michael donors or the polyfunctional Michael acceptors, or both, preferably have a functionality of greater than two.

A compound with at least two electron-deficient carbon multiple bonds is advantageously used as a Michael acceptor, such as C—C double bonds or C—C triple bonds, preferably C—C double bonds, per molecule as a functional Michael acceptor group.

In one embodiment of the invention, the Michael acceptor is a compound with at least one functional Michael acceptor group having the structure (I) or (II):

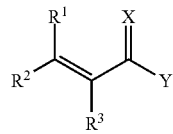

(I)

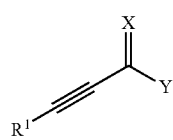

(II)

in which $R^1$, $R^2$ and $R^3$ are each hydrogen or organic radicals independent of each other, such as, for example, a linear, branched or cyclical, optionally substituted alkyl group, aryl group, aralkyl group (also called an aryl-substituted alkyl group) or alkaryl group (also called alkyl-substituted aryl group), including derivatives and substituted versions thereof, whereby these groups can contain, in combinations or independently of each other, additional ether groups, carboxyl groups, carbonyl groups, thiol analogue groups or groups containing nitrogen; X represents oxygen, sulfur or $NR^4$, in which $R^4$ stands for hydrogen or any of the organic groups, as described above for $R^1$, $R^2$ and $R^3$; Y represents $OR^5$, $SR^5$ or $NR^5OR^6$, wherein $R^5$ stands for hydrogen or each of the organic groups, as described above for $R^1$, $R^2$ and $R^3$.

The functional Michael acceptor group is preferably a group having the structure (III):

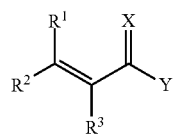

(III)

in which $R^1$, $R^2$ and $R^3$ are as described above and Y stands for $OR^5$ or $NR^5R^6$, whereby $R^5$ and $R^6$ are as described above.

Each functional Michael acceptor group can be directly attached to another functional Michael acceptor group or a backbone by means of one or more of $R^1$, $R^2$, $R^3$, $R^4$, $R^5$ or $R^6$.

As the Michael donor, any C—H acid compound can be used that has at least two functional Michael donor groups and can form carbanions, in particular enolate anions, which can be added in a Michael reaction to electron-deficient double bonds. A functional Michael donor group has at least one acid CH bond. Therefore a bifunctional Michael donor, containing two functional Michael donor groups, each of which has an acid CH bond, has available two acid CH bonds per molecule. A tri-functional Michael donor can contain three functional Michael donor groups, each with only one acid CH bond or it can contain two functional Michael donor groups, one group of which contains only one CH bond and the second group of which contains two acid CH bonds. The carbanion is generally released only after the cleaving of the Michael-active hydrogen atom by a suitable stoichiometric or catalytically active base.

The Michael-active hydrogen atom is advantageously bonded to a carbon atom that sits between 2 electron-attracting groups, such as C=O.

Examples of suitable functional Michael donor groups include β ketoesters, 1,3-diketones, malonic esters and malonic ester derivatives such as malonamide and β-keto-amide (in which the Michael-active hydrogen atoms are bonded to a carbon atom that sits between the carbonyl groups), cyanoacetate esters and cyanoacetamides (in which the Michael-active hydrogen atom is bonded to a carbon atom that sits between a carbonyl group and a cyano group) and α-nitroalkanes.

Each functional Michael donor group, analogous to the Michael acceptor group, can be bonded to another functional Michael donor group or directly to a backbone.

The polyfunctional Michael acceptor and/or the polyfunctional Michael donor of this invention can have a large number and variety of backbones, whereby the backbones can be identical or different.

In some embodiments of this invention, the backbone of the polyfunctional Michael donor or of the polyfunctional Michael acceptor or both is a monomer, and oligomer or polymer.

Preferred backbones for polyfunctional Michael acceptors have a molecular weight (Mw) of 5000 or less, more preferably a molecular weight of 2000 or less and most preferably of 1000 or less.

Preferred backbones for the polyfunctional Michael donor have a molecular weight (Mw) of 200 or greater.

Polymers that can be used are those mentioned here by way of example: polyalkylene oxide, polyurethane, polyethylene vinyl acetate, polyvinyl alcohol, polydienes, hydrated polydienes, alkyds, alkyd polyesters, (meth)acryl polymers, polyolefins, polyesters, halogenated polyolefins, halogenated polyesters and copolymers or mixtures thereof.

In some embodiments of the invention, one or more polyol compounds, i.e., one or more polyvalent alcohols, are used as at least one backbone. Some polyvalent alcohols that are suitable as backbones either for the polyfunctional Michael acceptor or the polyfunctional Michael donor, include for example alkane diols, alkylene glycols such as ethylene glycol, propylene glycol, glycerols, sugars, pentaerythritols, polyvalent derivatives thereof or mixtures thereof. Some examples for polyvalent alcohols that are suitable for use as backbones are neopentyl glycol, trimethylol propane, ethylene glycol and polyethylene glycol, propylene glycol and polypropylene glycol, butanediol, pentanediol, hexanediol, tricyclodecane dimethylol, 2,2,4-trimethyl-1,3-pentanediol, Bisphenol A, cyclohexane dimethanol, alkoxylated and/or propoxylated derivatives of neopentyl glycol and tetraethylene glycol cyclohexane dimethanol, hexanediol, castor oil and trimethylolpropane.

In one preferred embodiment, the structure (III) is bonded by means of $R^4$ by an ester bond to a polyol compound, whereby the polyol compound is as defined above.

Some suitable polyfunctional Michael acceptors in this invention include, for example, molecules in which some or all of the structures (II) are radicals of (meth)acrylic acid, fumaric acid or maleic acid, substituted versions or combinations thereof, that are attached to the polyfunctional Michael acceptor molecule by means of an ester bond. A compound with structures (II) that comprise two or more radicals of (meth)acrylic acid is herein designated a "polyfunctional (meth)acrylate." Polyfunctional (meth)acrylates with at least two double bonds that can function as the acceptor in the Michael addition are preferred.

Examples of suitable di(meth)acrylates include but are not limited to: ethylene glycol di(meth)acrylate, propylene glycol di(meth)acrylate, diethylene glycol di(meth)acrylate, dipropylene glycol di(meth)acrylate, triethylene glycol di(meth)acrylate, tripropylene glycol di(meth)acrylate, tetraethylene glycol di(meth)acrylate, tetrapropylene glycol di(meth)acrylate, polyethylene glycol di(meth)acrylate, polypropylene di(meth)acrylate, monoethoxylated or polymethoxylated Bisphenol A di(meth)acrylate, Bisphenol A diglycidyl ether di(meth)acrylate, resorcinol diglycidyl ether di(meth)acrylate, 1,3-propanediol di(meth)acrylate, 1,4-butanediol di(meth)acrylate, 1,5-pentanediol di(meth)acrylate, 1,6-hexanediol di(meth)acrylate, neopentyl glycol di(meth)acrylate, cyclohexane dimethanol di(meth)acrylate, monoethoxylated or polymethoxylated neopentyl glycol di(meth)acrylate, monopropoxylated or polypropoxylated neopentyl glycol di(meth)acrylate, monoethoxylated or polyethoxylated cyclohexane dimethanol di(meth)acrylate, propoxylated cyclohexane dimethanol di(meth)acrylate, aryl urethane di(meth)acrylate, aliphatic urethane di(meth)acrylate, polyester di(meth)acrylate and mixtures thereof.

Examples of suitable tri(meth)acrylates include but are not limited to: trimethylol propane tri(meth)acrylate, trifunctional (meth)acrylic acid-s-triazine, glycerol tri(meth)acrylate, monoethoxylated or polyethoxylated trimethylol propane tri(meth)acrylate, mono or poly propoxylated trimethylol propane tri(meth)acrylate, tri(2-hydroxyethyl) isocyanurate tri(meth)acrylate, monoethoxylated or polyethoxylated glycerol tri(meth)acrylate, monopropoxylated or polypropoxylated glycerol tri(meth)acrylate, pentaerythritol tri(meth)acrylate, aryl urethane tri(meth)acrylate, aliphatic urethane tri(meth)acrylate, melamine tri(meth)acrylate, epoxy Novolac tri(meth)acrylate, aliphatic epoxy tri(meth)acrylate, polyester tri(meth)acrylate and mixtures thereof.

Examples of suitable tetra(meth)acrylates include but are not limited to: di(trimethylolpropane) tetra(meth)acrylate, pentaerythritol tetra(meth)acrylate, monoethoxylated or polyethoxylated pentaerythritol tetra(meth)acrylate, monopropoxylated or polypropoxylated pentaerythritol tetra(meth)acrylate, dipentaerythritol tetra(meth)acrylate, monoethoxylated or polyethoxylated dipentaerythritol tetra(meth)acrylate, monopropoxylated or polypropoxylated dipentaerythritol tetra(meth)acrylate, aryl urethane tetra(meth)acrylate, aliphatic urethane tetra(meth)acrylate, melamine tetra(meth)acrylate, epoxy Novolac tetra(meth)acrylate, polyester tetra(meth)acrylates and mixtures thereof.

Mixtures of polyfunctional (meth)acrylates among one another can also be used.

Examples of suitable Michael donors include: acetoacetates of mono- or poly-ethoxylated and propoxylated diols, triols and polyols, ethylene glycol diacetoacetate, 1,2-propanediol diacetoacetate, 1,3-propanediol diacetoacetate, 1,4-butanediol diacetoacetate, 1,6-hexanediol diacetoacetate, neopentyl glycol diacetoacetate, Bisphenol A-diacetoacetate, mono- or poly-ethoxylated Bisphenol A-diacetoacetate, isosorbide diacetoacetate, cyclohexane dimethanol diacetoacetate, 1,3-benzoldimethanol diacetoacetate (1,3-BDDA), 1,4-benzol dimethanol diacetoacetate (1,4-BDDA), trimethylol propane triacetoacetate (Lonzamon AATMP), glycerin triacetoacetate, polycaprolactone triaceoacetate, pentaerythritol tetraacetoacetate, dipentaerythritol hexaacetoacetate, glucosetriacetoacetate, glucose tetraacetoacetate, glucose penta-acetoacetate, sucrose acetoacetate, sorbitol triacetoacetate, sorbitol tetra-acetoacetate, mono- or poly-ethoxylated neopentyl glycol diacetoacetate, propoxylated glucose acetoacetate, propoxylated sorbitol acetoacetate, propoxylated sucrose acetoacetate, polyester acetoacetate, wherein the polyester is derived from at least one diacid and at least one diol, 1,2-ethylene bis-acetoacetamide, polyester amide acetoacetate, wherein the polyester amide is derived from at least one diacid and at least one diamine, acetoacetate-functionalized castor oil, polyester polymers, and (meth)acrylate polymers.

The Michael donor can be used in isolation or as a mixture of two or more different compounds.

The degree of cross-linking of the binder and thus also the strength of the resulting coating as well as its elastic properties determine the functionality of the Michael acceptor and/or of the Michael donor. Simultaneously, this has a direct influence on the achievable expansion of the ash crust formed in the event of a fire.

In the composition of this invention, the relative proportion of polyfunctional Michael acceptors to polyfunctional Michael donors can be characterized by the relative equivalent ratio, which is the ratio of the number of all functional Michael acceptor groups having the structures (I), (II) or (III) in the composition to the number of Michael-active hydrogen atoms in the composition. In some embodiments, the reactive equivalent ratio is 0.1 to 10:1, preferably 0.2 to 5:1, even more preferably 0.3 to 3:1 and most preferably 0.5 to 2:1.

The reaction between the Michael acceptor and the Michael donor takes place in the presence of a catalyst. Usable catalysts include the bases conventionally used for Michael addition reactions, optionally in combination with the appropriate phase transfer catalyst, nucleophiles or phosphines that are known to a person skilled in the art. Quaternary ammonium carbonates, quaternary ammonium bicarbonates, phosphonium carbonates and phosphonium bicarbonates can also be used as catalysts.

Suitable bases are: tertiary amines such as triethylamine, ethyl-N,N-diisopropylamine, 1,4-diazabicyclo[2.2.2]octane (DABCO); "blocked" bases such as formiate salts of amine or amidine bases; amidine bases such as 1,8-diazabicyclo [5.4.0]undec-7-ene (DBU) and 1,5-diazabicyclo[4.3.0]non-5-ene (DBM); guanidine bases such as tetramethyl guanidine (TMG) and 1,5,7-triazabicyclo[4.4.0]dec-5-ene (TBD); inorganic bases such as potassium carbonate, potassium bicarbonate, phosphates and hydrogen phosphates, quaternary ammonium hydroxides such as benzyl trimethyl ammonium hydroxide and tetrabutyl ammonium hydroxide (TBAH); proton spongue such as 1,8-bis(dimethylamino) naphthaline; pyridine bases such as 2,6-di-tert-butylpyridine, 2,6-lutidine and dimethylaminopyridine (DMAP); carbonic acid salts such as sodium or potassium salts of carbonic acids, e.g., acetates, alcoholates such as sodium methanolate, potassium methanolate, sodium methanolate, potassium methanolate and potassium-tert-butyl alcoholate.

Suitable phase transfer catalysts are: quaternary ammonium or phosphonium compounds such as methyltriocytl ammonium chloride, benzyltrimethyl ammonium chloride, hexadecyltributyl phosphonium bromide, tetra-n-butylammonium chloride and tetra-n-butylammonium bromide. The catalysis of Michael addition reactions by phase transfer catalysts is described, for example, in E. Dies-Barra, A. de la Hoz, S. Merino, A. Rodriquez, P. Sanchez-Verdu, *Tetrahedron* 1998, 54, 1835.

Suitable nucleophiles are: primary or secondary alkyl amines such as n-pentylamine and di-n-propylamine.

Suitable phosphines are: tertiary phospines such as tri-n-propylphosphine, tri-n-butyl phospine, tri-n-octyl phosphine, dimethylphenyl phoshine, methyldiphenyl phospine or triphenyl phosphine, as described, for example, in J. W. Chan, C. E. Hoyle, A. B. Lowe, M. Bowman, *Macromolecules* 2010, 43, 6381-6388. In this regard, reference is also made to WO 2010/030771 A1, which is hereby incorporated by reference into this application.

Suitable quaternary ammonium carbonates or phosphonium carbonates are: tetramethyl ammonium methyl carbonate, tetramethyl ammonium ethyl carbonate, tetrabutyl ammonium methyl carbonate, tetrabutyl ammonium ethyl carbonate, tetrahexyl ammonium methyl carbonate, tetrahexyl ammonium ethyl carbonate, tetraoctyl ammonium methyl carbonate, tetraoctyl ammonium methyl carbonate, tetradecyl ammonium methyl carbonate, tetradecyl ammonium ethyl carbonate, hexadecyl trimethyl ammonium methyl carbonate, hexadecyl trimethyl ammonium methyl carbonate benzyl trimethyl ammonium methyl carbonate, benzyl trimethyl ammonium ethyl carbonate, tetrabutyl ammonium bicarbonate, tetrahexyl ammonium bicarbonate, benzyl trimethyl ammonium bicarbonate and tetrabutyl phosphonium methyl carbonate. Catalysts of this type are described, for example, in M. Fabris, V. Lucchini, M. Noè, A. Perosa, M. Selva, *Chem. Eur. J.* 2009, 15, 12273 and M. Fabris, M. Noè, A. Perosa, M. Selva, R. Ballini, *J. Org. Chem.* 2012, 77, 1805. In this regard, reference is also made to WO 11124663 A, which is hereby incorporated by reference into this application.

The catalyst can be added in catalytic quantities, in equimolar quantities or in excess.

Although the reaction of the Michael acceptor and of the Michael donor can occur in the absence of a solvent, it is sometimes necessary to modify and/or adjust the effectiveness of the reaction or the viscosity of the ingredients, in particular of the Michael acceptor.

Preference is given to the use of a solvent that has a low viscosity and participates in the reaction and is incorporated into the binder, a type of binder called a reactive diluent. Suitable reactive diluents are themselves Michael acceptors with at least one functional Michael acceptor group and although they can be monomers or oligomers, they are preferably monomers and can have the corresponding backbones described above.

The invention teaches that the ingredient C contains an additive that forms an insulating layer, wherein the additive can contain both individual compounds as well as a mixture of a plurality of compounds.

The additives in the form of an insulation layer that are used are advantageously those that under the action of heat form an expanding and insulating layer of flame retardant material. This layer protects the substrate against overheating and prevents or at least delays the alteration of the mechanical and static properties of load-bearing components as a result of the effect of heat. The formation of a voluminous insulating layer, namely an ash layer, can be effected by the chemical reaction of a mixture of compounds appropriately matched to one another that react with one another in the presence of heat. Systems of this type are known to a person skilled in the art under the term chemically intumescing systems and can be used according to the invention. Alternatively, the voluminous insulating layer can be formed by physical intumescence. Both systems can be used according to the invention alone or together in combination.

For the formation of an intumescing layer by chemical intumescence, at least three components are generally necessary, a carbon supplier, a dehydrogenation catalyst and a propellant, which in coatings, for example, are contained in a binder. Under the effect of heat, the binder softens and the fire protection additives are released, so that in the case of chemical intumescence they can react with one another or in the case of physical intumescence they can expand. As a result of thermal decomposition, from the dehydrogenation catalyst the acids that act as catalysts for the carbonization of the carbon suppliers are formed. Simultaneously, the propellant is thermally decomposed forming inert gases that effect an expansion of the carbonized material and optionally of the softened binder, forming a voluminous insulating foam.

In one embodiment of the invention in which the insulating layer is formed by chemical intumescence, the additive that forms the insulation layer comprises at least one carbon backbone former, unless the binder can be used to form the backbone, at least one acidifier, at least one propellant and at least one inorganic backbone former. The components of the additives are in particular selected so that they can develop a synergy, wherein some of the compounds can perform a plurality of functions.

As the carbon supplier, the intumescing fire protection formulations conventionally used and the compounds known to the person skilled in the art will be considered, such as starch-like compounds, e.g., starches and modified starches, and/or polyvalent alcohols (polyols), such as saccharides, oligosaccharides and polysaccharides, and/or a thermoplastic or durable plastic polymer resin binder such as a phenol resin, a urea resin, a polyurethane, polyvinyl chloride, poly(meth)acrylate, polyvinyl acetate, polyvinyl alcohol, a silicon resin and/or a rubber. Suitable polyols are polyols from the group consisting of sugar, pentaerythrite, dipentaerythrite, tripentaerythrite, polyvinyl acetate, polyvinyl alcohol, sorbitol and EO-PO polyols. Preference is given to the use of pentaerythrite, dipentaerythrite or polyvinyl acetate.

It should be noted that in the event of a fire, the binder itself can also perform the function of the carbon supplier.

As dehydrogenation catalysts or acidifiers, the compounds conventionally used in intumescing fire protection formulations and known to a person skilled in the art can be considered, such as a salt or an ester of an inorganic, non-volatile acid, selected from sulfuric acid, phosphoric acid or boric acid. Essentially, compounds containing phosphorus are used, which makes a very wide range available, because they extend over several oxidation stages of phosphorus, such as phosphine, phosphine oxides, phosphonium compounds, phosphates, elementary red phosphorus, phosphite and phosphate. As phosphoric acid compounds, the following can be considered by way of example: Monoammonium phosphate, di-ammonium phosphate, ammonium phosphate, ammonium polyphosphate, melamine phosphate, melamine resin phosphate, potassium phosphate, polyol phosphates such as pentaerythrite phosphate, glycerin phosphate, sorbite phosphate, mannite phosphate, dulcite phosphate, neopentyl glycol phosphate, ethylene glycol phosphate, dipentaerythrite phosphate etc. Preference is given to the use of a polyphosphate or an ammonium polyphosphate as a phosphoric acid compound. The term melamine resin phosphates is thereby used to mean compounds such as reaction products from Lamelite C (melamine formaldehyde resin) with phosphoric acid. As sulfuric acid compounds, the following can be mentioned, for example: ammonium sulfate, ammonium sulfamate, nitroaniline bisulfate, 4-nitroaniline-2-sulfonic acid and 4,4-dinitrosulfanilamide, etc. The boric acid compound can be melamine borate, for example.

As the propellant, the compounds conventionally used in fire protection formulations and known to a person skilled in the art can be considered, such as the cyanuric acid or isocyanuric acid and their derivatives, melamine and its derivatives. These are: cyanamide, dicyanamide, dicyanadiamide, guanidine and its salts, biguanide, melamine cyanurate, cyanuric acid salts, cyanic acid esters and amides, hexamethoxymethylmelamine, dimelamine pyrophosphate, melamine polyphosphate, melamine phosphate. Preference is given to the use of hexamethoxymethylmelamine or melamine (cyanuric acid amide).

Also suitable are components, the action of which is not limited to a single function, such as melamine polyphosphate, which acts both as an acidifier and is a propellant. Additional examples are described in GB 2 007 689 A1, EP 139 401 A1 and U.S. Pat. No. 3,969,291 A1.

In one embodiment of the invention, in which the insulating layer is formed by physical intumescence, the additive that forms the insulating layer comprises at least one thermally expandable compound such as a graphite intercalation compound, which is also known as expanded graphite. These compounds can also be incorporated into the binder.

As expanded graphite, for example, intercalation compounds of $SO_x$, $NO_x$, halogen and/or acids in graphite can be considered. These are also termed graphite salts. Preference is given to expanded graphites that, during expansion at temperatures of 120 to 350° C., for example, give off $SO_2$, $SO_3$, NO and/or $NO_2$. Expanded graphite can be present, for example, in the form of flakes with the maximum diameter in the range from 0.1 to 5 mm. This diameter preferably lies in the range from 0.5 to 3 mm. Expanded graphites in the composition according to the invention are commercially available. In general, the expanded graphite particles are distributed uniformly in the composition according to the invention. The concentration of expanded graphite particles can also be in the form of isolated parties, in a pattern, covering a wide area and/or in a sandwich fashion. In this regard, reference is made to EP 1489136 A1, the text of which is hereby incorporated into this application by reference.

Because the ash crust formed in the event of a fire is sometimes too unstable and therefore, depending on its density and structure, can be expanded by air currents, for example, which has a negative effect on the insulating action of the coating, at least one ash crust stabilizer can be added to the components listed above.

As ash crust stabilizers or backbone formers, the compounds conventionally used in fire protection formulations and known to a person skilled in the art can be considered, for example expanded graphite and metals in particulate form such as aluminum, magnesium, iron and zinc. The metal in the form of particles can be in the form of a powder, flakes, scales, fibers, filaments and/or whiskers, wherein the particulate metal in the form of powder, flakes or scales has a particle size of ≤50 µm, preferably from 0.5 to 10 µm. In the case of the use of the particulate metal in the form of fibers, filaments and/or whiskers, a thickness of 0.5 to 10 µm and a length of 10 to 50 µm is preferred. Alternatively or in addition, as the ash crust stabilizer, an oxide or a compound of a metal selected from the group consisting of aluminum, magnesium, iron or zinc can be used, in particular iron oxide preferably iron trioxide, titanium dioxide, a borate such as zinc borate and/or a glass frit consisting of glass with a low melting point with a melting temperature of preferably 400° C. or above, phosphate or sulfate glass, melamine poly zinc sulfates, ferroglass or calcium borosilicates can be used. The addition of an ash crust stabilizer of this type contributes to a significant stabilization of the ash crust in the event of a fire because these additives increase the mechanical strength of the intumescing layer and/or prevent it from dripping.

Examples of additives of this type are also described in U.S. Pat. Nos. 4,442,157 A, 3,562,197 A, GB 755 551 A and EP 138 546 A1.

Ash crust stabilizers such as melamine phosphate or melamine bromate can also be used.

Optionally, one or more reactive flame retardants can also be added to the composition claimed by the invention. Compounds of this type are incorporated into the binder. One example that can be used according to the invention is reactive organo-phosphorus compounds such as 9-10-di-hydro-9-oxa-10-phosphaphenanthrene-10-oxide (DOPO) and its derivatives and adducts. Compounds of this type are described, for example, in S. V. Levchik, E. D. Weil, *Polym. Int.* 2004, 53, 1901-1929 or E. D. Weil, S. V. Levchik (Editor), Flame Retardants for Plastics and Textiles—Practical Applications, Hanser, 2009.

The additive forming the insulation layer can be present in a quantity of 30 to 99 wt. % in the composition, wherein the quantity is essentially a function of the form of application of the compound, i.e., "spraying, brushing etc." To achieve the highest possible intumescence rate, the proportion of the ingredient C in the total formulation is set as high as possible. Preferably, the proportion of the ingredient C in the total formulation is 35 to 85 wt. % and particularly preferably 40 to 85 wt. %.

In addition to the additives forming the insulation layer, the composition can also contain conventional auxiliary agents such as wetting agents, e.g., on the basis of polyacrylate and/or polyphosphate, defoamers such as silicon defoamers, thickeners such as alginate thickeners, colorants, fungicides, softeners such as waxes containing chlorine, binders, flame retardants or various fillers such as vermiculite, inorganic fibers, quartz sand, micro glass spheres, mica, silicon dioxide, mineral wool, etc.

Additional additives such as thickeners, rheology additives and fillers, can also be added to the composition. As rheology additives, such as anti-settling agents, anti-sag agents and thixotropic agents, preference is given to the use of polyhydroxycarbonic acid amides, urea derivatives, salts of unsaturated carbonic acid esters, alkyl ammonium salts of acid phosphoric acid derivatives, ketoxime, amine salts of p-toluoene sulfonic acid, amine salts of sulfonic acid derivatives and aqueous or organic solutions or mixtures of the compounds used. Rheology additives based on pyogenic or precipitated silicic acid or based on silanized pyogenic or precipitated silicic acids can also be used. Preferably the rheology additive is pyogenic silicic acids, modified and unmodified stratified silicates, precipitated silicic acids, cellulose ether, polysaccharides, PU and acrylate thickeners, urea derivatives, castor oil derivatives, polyamides and fatty acid amides and polyolefins, provided that they are present in solid form, pulverized celluloses and/or some suspension agents such as xanthan gum.

The composition claimed by the invention can be packaged as a two-ingredient or multi-ingredient system.

If the ingredient A and the component B do not react with each other at room temperature without the use of the catalyst they can be stored together. If a reaction takes place at room temperature, the ingredient A and the ingredient B can be stored separately to inhibit any reaction. In the presence of the catalyst, the catalyst must be stored separately from the ingredient B. If, on account of the nature of the catalyst, it reacts with ingredient A, it must be stored separately from both ingredients. A person skilled in the art will know or will easily be able to determine what catalyst can be stored together with ingredient A. In general, it is important that the ingredients A and B of the binder and the catalyst are mixed together and the curing reaction is initiated only immediately before use.

The ingredient C can thereby exist as one or more components, either as a complete mixture or divided into individual components. Ingredient C is divided into individual components as a function of the compatibility of the compounds contained in the composition, so that there can be neither a reaction of the compounds contained in the composition with each other nor any adverse effects on one another. The decision depends on the compounds used. This measure ensures that the highest possible proportion of fillers can be achieved. That leads to a high rate of intumescence, even with low layer thicknesses of the composition.

If the composition contains at least one ash crust stabilizer, it can be contained in an ingredient of the single-component or multi-component system. Alternatively, it can be divided between the at least two components in an appropriate manner.

The composition is applied in the form of a paste by means of a brush, a roller or by spraying on the substrate, in particular a metal substrate. The composition is preferably applied by means of an airless spray process.

The composition claimed by the invention is characterized, compared with solvent-based and water-based systems, by a relatively fast curing by means of an addition reaction and therefore has no need of a physical drying. This becomes particularly important if the coated components are to be subjected to a load or reprocessed quickly, whether by coating with a cover layer or in the form of movement or transport of the components. The coating is therefore also significantly less sensitive to external factors on the construction site, e.g., exposure to (rain) water or dust and dirt, which in solvent-based or water-based systems can lead to a washing out of water-soluble ingredients such as ammonium polyphosphate, or, in the event of the absorption of dust, can result in reduced intumescence. On account of the low viscosity of the composition, in spite of the high proportion of solids, which without the addition of highly volatile solvents can account for up to 99 wt. % of the composition, the composition remains easy to process, in particular using conventional spray methods. On account of the low softening point of the binder and the high proportion of solids, even with a low layer thickness, the expansion rate upon exposure to heat is high, wherein the intumescence factor lies in the range of 5 to 50 times the layer thickness of a coating. The ash crust formed in the event of a fire is extremely hard and stable and lies in the range of 0.50 to 0.99, measured according to the method described below.

Therefore the composition according to the invention is suitable in particular for use as a fire protection coating, in particular a sprayable coating for components on a metal and nonmetal base, in particular for components made of steel and components made of wood.

The composition claimed by the invention is suitable for use above all in the construction sector as a coating, in particular as a fire protection coating for structural steel elements, but also for structural elements made of other materials such as concrete or wood, as well as a fire protection coating for individual cables, cable bundles, cable races and cable trays or other lines.

An additional object of the invention is therefore the use of the composition claimed by the invention as a coating, in particular as a fire protection coating, for construction components or construction elements made of steel, cement, wood and other materials such as plastics.

This invention further relates to objects that are obtained when the composition claimed by the invention is cured. The objects have excellent insulation layer forming properties.

The invention is explained in further detail by the examples presented below.

EXEMPLARY EMBODIMENTS

The ingredients listed below are used for the production of the compounds claimed by the invention that form an insulation layer. The individual components are always combined and homogenized by means of a dissolver. For use, these mixtures are then mixed and applied either before spraying or preferably during spraying.

The curing behavior of the composition was observed, as well as the intumescence factor and the relative ash crust stability. For this purpose, the compounds were each placed in a round Teflon mold 2 mm deep and 48 mm in diameter.

The curing time thereby equals the time after which the specimens were cured and could be removed from the Teflon mold.

For the determination of the intumescence factor and the relative ash crust stability, a muffle furnace was preheated to 600° C. Multiple measurements of the specimen thickness were taken with a vernier caliper and the average value $h_M$ was calculated. The specimens were then each placed in a cylindrical steel mold and heated for 30 minutes in the muffle furnace. After cooling to room temperature, the height of the foam $h_{E1}$ was first measured nondestructively (average value of multiple measurements). The intumescence factor I is calculated as follows:

$$I = h_{E1} : h_M \quad \text{Intumescence factor I:}$$

Then a defined weight (m=105 g) was allowed to drop from a defined height (h=100 mm) into the cylindrical steel mold and onto the foam, and after this partly destructive action the remaining phone height $h_{E2}$ was determined. The relative ash crust stability was calculated as follows:

$$AKS = h_{E2} : h_{E1} \quad \text{Relative ash crust stability (AKS):}$$

For the following examples 1 to 8 and the comparative examples 2 and 3, the following composition was used as ingredient C and the composition was added in the indicated quantities:

Ingredient C:

| Ingredient | Quantity [g] |
| --- | --- |
| Pentaerythrite | 8.7 |
| Melamine | 8.7 |
| Ammonium polyphosphate | 16.6 |
| Titanium dioxide | 7.9 |

EXAMPLE 1

Ingredient A

| Ingredient | Quantity [g] |
| --- | --- |
| TMPTA [1] | 11.9 |
| DBU [2] | 0.56 |

[1] Trimethylol propane triacrylate
[2] 1,8-diazabicyclo[5.4.0]undec-7-ene

Ingredient B

| Ingredient | Quantity [g] |
| --- | --- |
| Trimethylol propane triacetoacetate [3] | 15.5 |

[3] Lonzamon AATMP

Ingredient C

| Ingredient | Quantity [g] |
| --- | --- |
| as indicated above | 42.0 |

To produce a 2-component system, ingredient C was divided between ingredients A and B.

EXAMPLE 2

Ingredient A

| Ingredient | Quantity [g] |
| --- | --- |
| TMPTA | 16.6 |
| DBU | 0.56 |

Ingredient B

| Ingredient | Quantity [g] |
| --- | --- |
| Trimethylolpropane triacetoacetate | 10.8 |

Ingredient C

| Ingredient | Quantity [g] |
| --- | --- |
| as indicated above | 42.0 |

To produce a two-component system, ingredient C was divided between Ingredients A and B.

EXAMPLE 3

Ingredient A

| Ingredient | Quantity [g] |
| --- | --- |
| Pentaerythritol triacrylate | 12.0 |
| DBU | 0.56 |

Ingredient B

| Ingredient | Quantity [g] |
| --- | --- |
| Trimethylolpropane triacetoacetate [3] | 15.5 |

[3] Lonzamon AATMP

Ingredient C

| Ingredient | Quantity [g] |
| --- | --- |
| as indicated above | 42.0 |

To produce a two-component system, ingredient C was divided between ingredients A and B.

EXAMPLE 4

Ingredient A

| Ingredient | Quantity [g] |
| --- | --- |
| Pentaerythritol triacrylate | 16.7 |
| DBU | 0.56 |

Ingredient B

| Ingredient | Quantity [g] |
| --- | --- |
| Trimethylolpropane triacetoacetate [3] | 10.8 |

[3] Lonzamon AATMP

Ingredient C

| Ingredient | Quantity [g] |
| --- | --- |
| as indicated above | 42.0 |

To produce a two-component system, ingredient C was divided between ingredients A and B.

EXAMPLE 5

Ingredient A

| Ingredient | Quantity [g] |
| --- | --- |
| Propoxylated glycerol triacrylate | 14.4 |
| DBU | 0.7 |

Ingredient B

| Ingredient | Quantity [g] |
| --- | --- |
| Trimethylolpropane triacetoacetate [3] | 13.0 |

[3] Lonzamon AATMP

Ingredient C

| Ingredient | Quantity [g] |
| --- | --- |
| as indicated above | 42.0 |

To produce a two-component system, ingredient C was divided between ingredients A and B.

EXAMPLE 6

Ingredient A

| Ingredient | Quantity [g] |
| --- | --- |
| Propoxylated glycerol triacrylate | 18.8 |
| DBU | 0.7 |

Ingredient B

| Ingredient | Quantity [g] |
| --- | --- |
| Trimethylolpropane triacetoacetate [3] | 8.5 |

[3] Lonzamon AATMP

Ingredient C

| Ingredient | Quantity [g] |
| --- | --- |
| as indicated above | 42.0 |

To produce a two-component system, ingredient C was divided between ingredients A and B.

EXAMPLE 7

Ingredient A

| Ingredient | Quantity [g] |
| --- | --- |
| TMPTA [1] | 8.3 |

[1] Trimethylol propane triacrylate

Ingredient B

| Ingredient | Quantity [g] |
| --- | --- |
| Trimethylol propane triacetoacetate [2] | 10.8 |
| $K_2CO_3$ | 1.0 |

[2] Lonzamon AATMP

Ingredient C

| Ingredient | Quantity [g] |
| --- | --- |
| as indicated above | 30.0 |

To produce a two-component system, ingredient C was divided between ingredients A and B.

EXAMPLE 8

Ingredient A

| Ingredient | Quantity [g] |
| --- | --- |
| TMPTA [1] | 10.2 |

[1] Trimethylol propane triacrylate

Ingredient B

| Ingredient | Quantity [g] |
| --- | --- |
| Trimethylol propane triacetoacetate [2] | 8.8 |
| $K_2CO_3$ | 1.0 |

[2] Lonzamon AATMP

Ingredient C

| Ingredient | Quantity [g] |
|---|---|
| as indicated above | 30.0 |

To produce a two-component system, ingredient C was divided between ingredients A and B.

Shrinkage with all compositions was less than 5.0%.

COMPARATIVE EXAMPLE 1

A commercial fire protection product (Hilti CFP S-WB) based on aqueous dispersion technology was used for a comparison.

COMPARATIVE EXAMPLE 2

A standard epoxy-amine system (Jeffamin® T-403, liquid, solvent-free and crystallization-stable epoxy resin, consisting of low-molecular epoxy resins on the basis of Bisphenol A and Bisphenol F (Epilox® AF 18-30, Leuna-Harze GmbH) and 1,6-hexanediol diglycidyl ether), which is filled to 60% with an intumescence mixture analogous to the above examples, was tested as an additional comparison.

COMPARATIVE EXAMPLE 3

As a further comparison, a standard epoxy-amine system (isophorone diamine, trimethylol propane triacrylate and liquid, solvent-free and crystallization-stable epoxy resin, consisting of low molecular epoxy resins on the basis of Bisphenol A and Bisphenol F (Epilox® AF 18-30, Leuna-Harze GmbH)), which is filled to 60% with an intumescence mixture analogous to the above examples, was tested.

Table 1 shows that the relative ash crust stability, with an identical content of additive that forms an insulation layer, is significantly higher than that of comparative example 2 (Epoxy-amine system). The curing times were also significantly shorter than those of the comparative systems and are in the range of one to three hours.

TABLE 1

Results of measurements of the intumescence factor, ash crust stability and curing time

| Example | Intumescence factor I (by a factor of) | Relative ash crust stability AKS (by a factor of) | Specimen thickness/TM (millimeters) | Curing time (h) |
|---|---|---|---|---|
| 1 | 16 | 0.92 | 3.2 | 1 |
| 2 | 9 | 0.8 | 2.8 | 1 |
| 3 | 26 | 0.97 | 2.8 | 2 |
| 4 | 29 | 0.95 | 2.8 | 2 |
| 5 | 12 | 0.97 | 2.8 | 2.5 |
| 6 | 9 | 0.88 | 2.6 | 2.5 |
| 7 | 25 | 0.97 | 1.9 | 1 |
| 8 | 37 | 0.84 | 1.8 | 0.5 |
| Comparative example 1 | 36 | 0.62 | 1.8 | 10 days |
| Comparative example 2 | 22 | 0.04 | 1.6 | 12 h |
| Comparative example 3 | 1.7 | 0.60 | 1.2 | 1 day |

The invention claimed is:

1. A coating composition comprising:
(a) an ingredient A that contains a polyfunctional Michael acceptor that has at least two electron-deficient carbon multiple bonds per molecule as functional Michael acceptor groups,
wherein the functional Michael acceptor groups have the structure (III):

$$\text{(III)} \quad \underset{R^3}{\underset{|}{R^2}}\overset{R^1}{\underset{|}{C}}=C\begin{matrix}X\\\|\\Y\end{matrix}$$

in which
R$^1$, R$^2$ and R$^3$ are each hydrogen; Y represents OR$^5$, wherein R$^5$ is hydrogen or a linear, branched, or cyclical, optionally substituted alky group;
(b) an ingredient B that contains a polyfunctional Michael donor that has at least two C, H acid groups per molecule as functional Michael donor groups,
wherein the functional Michael donor groups are β-ketoesters;
(c) an ingredient C that contains an additive that forms an insulation layer,
wherein the additive forming the insulation layer is a mixture comprising at least one dehydrogenation catalyst and at least one propellant; and
(d) a catalyst for the Michael addition reaction,
wherein the coating composition forms an insulation layer upon exposure to heat.

2. The composition of claim 1, wherein each functional Michael acceptor group is attached by means of one or more of R$^1$, R$^2$, R$^3$, or R$^5$ to another functional Michael acceptor group, which can be identical or different, or directly attached to a backbone.

3. The composition of claim 2, wherein the functional Michael acceptor groups are bonded by means of R$^5$ to a polyol compound, an oligomer or polymer.

4. The composition of claim 3, wherein the functional Michael acceptor groups or the functional Michael donor groups are each independently bonded to a polyol compound that is selected from the group consisting of pentaerythritol, trimethylolpropane, ethylene glycol and polyethylene glycols, propylene glycols and polypropylene glycols.

5. The composition of claim 1, wherein the composition has a reactive equivalent ratio in the range of 0.1:1 to 10:1.

6. The composition of claim 1, wherein the additive forming the insulation layer further comprises at least one carbon supplier.

7. The composition of claim 6, wherein the additive forming the insulation layer further comprises an ash crust stabilizer.

8. The composition of claim 1, wherein the composition also contains organic and/or inorganic additives.

9. The composition of claim 1, wherein the composition is packaged as a two-component or multi-component system.

10. The composition of claim 9,
wherein the ingredient C is contained in a single component of the two-component or multi-component system; or
wherein the ingredient C is contained in multiple components of the two-component or multi-component system in the form of a complete mixture or in the form of individual components.

11. The composition of claim 7,
wherein the composition is packaged as a two-component or multi-component system, and wherein the ash crust stabilizer is contained in one component of the two-component or multi-component system, or wherein the ash crust stabilizer is divided among the components of the two-component or multi-component system.

12. A coating comprising the composition of claim 1.

13. The coating of claim 12, wherein the coating is for steel construction elements.

14. The coating of claim 12, wherein the coating is for non-metallic components.

15. The coating of claim 12, wherein the coating is a fire protection coating.

* * * * *